United States Patent Office 3,749,681
Patented July 31, 1973

---

3,749,681
CATALYST FOR SELECTIVE HYDROGENATION OF POLYUNSATURATED VEGETABLE OILS
Sambasivarao Koritala, Peoria, Ill., assignor to the United States of America as represented by the Secretary of Agriculture
No Drawing. Filed Feb. 26, 1971, Ser. No. 119,378
Int. Cl. B01j *11/82*
U.S. Cl. 252—438                            2 Claims

ABSTRACT OF THE DISCLOSURE

A catalyst is described which will selectively reduce the linolenate moiety of polyunsaturated vegetable oils. The catalyst is particularly characterized as having excellent reuse properties. A procedure for the preparation of this highly active catalyst by chemisorption of copper-ammonium complex on silica gel is also described.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to an active hydrogenation catalyst which is highly selective towards the reduction of the linolenate moiety of polyunsaturated vegetable oils. The invention further relates to a hydrogenation catalyst having excellent reuse properties.

The ability of a catalyst to retain its activity after successive reuse is a highly desirable property for vegetable oil hydrogenation. Semicontinuous or continuous operation of equipment without having to replace and reactivate catalysts would grant the industry a substantial economic advantage.

Therefore, the object of this invention is to produce a reusable highly active hydrogenation catalyst which will reduce the linolenate moiety of polyunsaturated vegetable oils to less than 1 percent without substantially decreasing the linoleate moieties. The catalyst must be reusable at least four times with essentially no loss of activity.

Supported copper catalysts have been prepared by several methods including exchanging copper onto molecular sieves, coprecipitating copper and silicon hydroxides, and precipitating copper hydroxides onto inert supports such as alumina and silica gels. In a previous patent, U.S. 3,515,678, I showed that by precipitating copper hydroxides onto pyrolysed silica having an average particle size of 12 m$\mu$, a surface area of 200 sq. m./g., and a surface hydroxyl group content of 1.5 meq./g. soybean oil could be hydrogenated to a linolenate level of 0.4 percent of 11.5 minutes giving a selectivity ratio of $K=K_{Le}/L_{Lo}=16$ ($K_{Le}$=rate of reaction with linolenate moiety; $K_{Lo}$=rate of reaction with linoleate moiety; K was determined by the method of Butterfield and Dutton, JAOCS 44: 549–550 (1967)). In a publication, S. Koritala, JAOCS 45(3): 197–200 (1968), I compared the above catalyst (support G, Table 1) with others having different supports (see Table 1).

TABLE 1

| Silica gel catalyst support | Catalyst support properties | | | | Results of hydrogenation of soybean oil with supported copper catalyst (0.1% by wt. of oil) | | |
|---|---|---|---|---|---|---|---|
| | Particle size, $\mu$ | Surface area, m.²/g. | Pore volume, cc./g. | Pore diameter, A. | Reaction time, min. | Linolenate remaining, percent | Selectivity $K_{Le}/K_{Lo}$ |
| A | (¹) | 800 | 0.45 | ² NA | 48 | 0.9 | 10.9 |
| B | 54–65 | 600 | 1.00 | 67 | 45 | 0.7 | 13.8 |
| C | 54–65 | 350 | 1.04 | 120 | 30 | 0.7 | 12.6 |
| D | 10 | 830 | ² NA | NA | 28 | 0.6 | 13.1 |
| E | 4 | 370 | NA | NA | 32 | 0.6 | 14.3 |
| F | 3 | 300 | NA | NA | 33 | 0.8 | 13.2 |
| G-1 | .012 | 200 | NA | NA | 12.5 | 0.5 | 16.0 |
| G-2 | .012 | 200 | NA | NA | 13 | 0.8 | 13.2 |
| G-3 ³ | .012 | 200 | NA | NA | 25 | 0.8 | 12.7 |
| H | 3 | 260 | NA | NA | 13 | 0.6 | 14.4 |
| I | .007 | 390 | NA | NA | 18 | 0.6 | 15.2 |

¹ 200–325 mesh.
² Data not available.
³ Catalyst recovered from run G-2 and reused.

Only catalyst made by precipitating copper onto support G, and perhaps H, would be considered sufficiently active to be useful. However, these catalysts are not reusable. Supports shown on the table, other than G and H, would be essentially equivalent. When the catalyst on support G was reused, the activity dropped to one half.

Another method of depositing metal catalysts on siliceous supports was described by B. F. Mulaskey, U.S. Pat. 3,328,316. Instead of precipitating copper hydroxide, ammonium hydroxide was used in excess to form a copper ammonium complex which was readily adsorbed by silica. Mulaskey teaches that the process is accomplished by chemisorption and that the complex is not removed by washing. Copper catalysts prepared by this method using the support described in U.S. Pat. 3,515,678, supra, proved to be quite inactive. Other supports containing adsorbed copper ammonium complex, which were previously tested as described in the publication by Koritala, supra, exhibited very poor catalyst activity when used to hydrogenate soybean oil (see Table 2).

TABLE 2

| Catalyst support: | Hydrogenation time, min. |
| --- | --- |
| A [1] | 35 |
| C [1] | 25 |
| D [1] | 40 |
| G [1] | 31 |
| J [2] | 23 |
| K [3] | 17 |
| 13 X molecular sieve | No reaction. |
| Type Y molecular sieve | No reaction. |

[1] For description, see Table 1.
[2] Silica gel, avg. particle size, 100–325 mesh; surface area, 285 m.$^2$/g.; pore volume, 1.2 cc./g.; avg. pore diameter, 168 A.
[3] Silica gel, avg. particle size, 54–65$\mu$; surface area, 350 m.$^2$/g.; pore volume, 1.7 cc./g.; avg. pore diameter, 200 A.

It was unexpectedly discovered that one particular silica gel not only gave an active catalyst but in accordance with the objects of this invention, when this silica gel adsorbed the copper ammonium complex, a catalyst was produced that was highly active, very selective, and could be reused up to four times with essentially no loss of activity.

A copper ammonium complex is adsorbed onto silica gel consisting of microspheroidal particles having average diameters of 54 to 65$\mu$, a surface area of from about 600 to 750 m.$^2$/g., a pore volume of about 1 cc./g., and average pore diameters of from 59 to 67 A. This catalyst has the ability to hydrogenate linolenate-containing vegetable oils such as soybean oil to a linolenate concentration of less than about 1 percent in about 11 to 13 minutes with a selectivity, $K_{Le}/K_{Lo}$, of from about 13 to 18. The reaction parameters of about 170° C. and 30 p.s.i.g. hydrogen pressure will give the above results. This catalyst can be reused up to 4 times with essentially no loss of activity.

DETAILED DESCRIPTION OF THE INVENTION

When copper ammonium complex cations adsorb onto silica gel, they cannot be removed by water washing. However, most silica gels in the representative group in Table 2 did not adsorb all the complex from solution even after prolonged standing. Under the same conditions (see Example 1, infra) the instant catalyst support did irreversibly adsorb all the copper ammonium complex from solution. A catalyst having the defined characteristics of the invention was obtained by contacting a dilute solution of the complex with the instant catalyst support for 15 minutes. The preferred contact time is 7 hours to assure complete adsorption. There was some loss of activity in catalysts prepared with contact times of 24 hours or longer. This is believed to be due to the fact that silica gel is slightly soluble in alkaline solutions.

For the same reasons, it is preferable to use a dilute copper ammonium complex solution. Since it has been established that adsorption takes place quickly, solution having higher pH could be used at shorter contact times. However, a catalyst prepared with 7 hours contact time with double the usual amount of ammonia had decreased activity. In the preparation of the complex the molar ratio of ammonium ions to copper II ions must be greater than 2:1 or copper II will precipitate as the hydroxide. Copper ammonium complex only forms when excess ammonium is present.

Relative amounts of complex and support depends upon the hydrogenation procedures and equipment in which the catalyst will be used. The scale of reaction described in the examples is small, and a catalyst concentration of 0.1% metal by weight of oil was found to be optimum. When hydrogenating 300 ml. of soybean oil in a batch system, about 5 g. of catalyst support containing about 0.3 g. of copper II was a relatively convenient amount to separate from the hydrogenated oil for reuse in subsequent reactions. In other systems such as continuous or semicontinuous operations, the amounts of solids present would vary considerably.

The following examples are only for the purpose of illustration and should not be construed as limiting the scope of the invention.

EXAMPLE 1

To 5 ml. of an aqueous solution containing 1 g. of copper nitrate (Cu(NO$_3$)$_2$3H$_2$O), 1.8 ml. of 30 percent ammonium hydroxide was added and the volume made up to 100 ml. with distilled water. About 5 g. of silica gel consisting of microspheroidal particles with average size, 54 to 65$\mu$; surface are, 600 to 750 m.$^2$/g.; pore volume, 1 cc./g.; average pore diameter, 59 to 67 A. (MS–GEL, Davison Chemical, W. R. Grace and Co.) was shaken with the copper-complex solution. The blue color disappeared from the solution instantly as the complex was adsorbed on the surface of the gel. The solution was left for 7 hours with occasional shaking. The gel containing copper-ammonia complex catalyst was separated by filtration, wash with distilled water, dried at 110° C., and calcined in air at 350° C. for 2 hours.

EXAMPLE 2

The catalyst prepared in Example 1 was added to 300 ml. of refined and bleached soybean oil and hydrogenated in a Parr apparatus at 170° C. and 30 p.s.i.g. hydrogen pressure. For comparative purposes both the hydrogenation procedure and the analytical methods were the same as those used in previous work, S. Koritala, supra. At the end of hydgenation the oil and catalyst mixture was centrifuged. After pouring off the supernatant oil, the catalyst was transferred back for reuse into the hydrogenator by repeated washings with small amounts of a fresh batch of soybean oil. Additional fresh oil was added to the vessel to a total of 300 ml., and the hydrogenation and oil recovery was repeated. In this manner a total of 5 hydrogenation runs were accomplished. Table 3 gives the results of the 5 runs.

TABLE 3.—HYDROGENATION OF SOYBEAN OIL WITH COPPER CATALYST [1]

| Hydrogenation number | Catalyst | Reaction time, min. | Percent linolenate (alkali isomerization) | Selectivity, $K_{Le}/K_{Lo}$ |
| --- | --- | --- | --- | --- |
| 1 | Silica gel-copper ammonia complex. | 12 | 0.6 | 18 |
| 2 | Reuse from No. 1 | 11 | 0.6 | 15 |
| 3 | Reuse from No. 2 | 12 | 0.6 | 15 |
| 4 | Reuse from No. 3 | 13 | 0.6 | 14 |
| 5 | Reuse from No. 4 | 13 | 0.8 | 13 |

[1] Total of 300 ml. oil at 170° C. and 30 p.s.i.g.; catalyst 0.3 g. calculated as copper oxide.

I claim:

1. A highly active reusable catalyst for the selective partial hydrogenation of linolenate-containing vegetable oils consisting essentially of a copper-ammonium complex absorbed onto silica gel in a weight ratio of about 0.3:5 CuII:silica gel, sail silica gel consisting of microspheroidal particles having average diameters of 54 to 65$\mu$, surface areas of from about 600 to 750 m.$^2$/g., pore volumes of about 1 cc./g., and average pore diameters of from about 59 to 67 A.

2. A method of producing highly active reusable catalysts for the selective partial hydrogenation of linolenate-containing vegetable oils consisting essentially of slurrying silica gel for 15 minutes to 24 hours in an aqueous solution containing an amount of copper-ammonium complex such that the weight ratio of CuII:silica gel is about 0.3:5, said silica gel consisting of microspheroidal particles having average diameters of 54 to 65μ, surface areas of from about 600 to 750 m.$^2$/g., pore volumes of about 1 cc./g., and average pore diameters of from about 59 to 67 A.; removing the silica gel from the slurry; washing the silica gel with water; and heating the silica gel at about 350° C. for about 2 hours.

References Cited
UNITED STATES PATENTS

| | | | |
|---|---|---|---|
| 2,289,924 | 7/1942 | Morrell et al. | 252—438 |
| 3,328,316 | 6/1967 | Mulaskey | 252—438 |
| 3,515,678 | 6/1970 | Koritala | 252—454 |

PATRICK P. GARVIN, Primary Examiner

U.S. Cl. X.R.

260—409